(12) United States Patent
Tanaka et al.

(10) Patent No.: US 8,337,062 B2
(45) Date of Patent: Dec. 25, 2012

(54) LED LIGHTING UNIT AND VEHICLE LAMP

(75) Inventors: Hidemi Tanaka, Tokyo (JP); Yukio Yamanaka, Tokyo (JP); Kunihiko Seki, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 280 days.

(21) Appl. No.: 12/414,489

(22) Filed: Mar. 30, 2009

(65) Prior Publication Data

US 2009/0251916 A1 Oct. 8, 2009

(30) Foreign Application Priority Data

Mar. 28, 2008 (JP) ................................ 2008-087470

(51) Int. Cl.
*F21S 8/10* (2006.01)
*F21V 21/00* (2006.01)
*F21V 1/00* (2006.01)
*F21V 11/00* (2006.01)

(52) U.S. Cl. ........................................ 362/545; 362/241

(58) Field of Classification Search .................. 362/543, 362/544, 545, 540, 541, 542, 506, 507, 516, 362/517, 518, 519, 235, 236, 237, 240, 241, 362/247

See application file for complete search history.

(56) References Cited

U.S. PATENT DOCUMENTS

| | | | |
|---|---|---|---|
| 7,059,754 B2* | 6/2006 | Lekson et al. ................. | 362/545 |
| 7,144,145 B2* | 12/2006 | Watanabe et al. ............. | 362/544 |
| 7,168,836 B2* | 1/2007 | Tatsukawa .................... | 362/538 |
| 7,387,417 B2* | 6/2008 | Sazuka et al. ................. | 362/544 |
| 7,401,959 B2* | 7/2008 | Kogo et al. .................... | 362/540 |
| 7,427,152 B2* | 9/2008 | Erion et al. .................... | 362/547 |
| 7,479,660 B2* | 1/2009 | Kobilke .......................... | 257/89 |
| 7,578,600 B2* | 8/2009 | Czajkowski ................... | 362/243 |
| 7,585,096 B2* | 9/2009 | Fallahi et al. ................. | 362/517 |
| 2004/0085779 A1* | 5/2004 | Pond et al. .................... | 362/516 |
| 2007/0279927 A1* | 12/2007 | Yamamichi et al. .......... | 362/545 |
| 2009/0027910 A1* | 1/2009 | Nagasawa et al. ............ | 362/518 |
| 2009/0201694 A1* | 8/2009 | Okada et al. .................. | 362/516 |

FOREIGN PATENT DOCUMENTS

| | | |
|---|---|---|
| JP | 2002093206 | 3/2002 |
| JP | 2007305575 | 11/2007 |

* cited by examiner

*Primary Examiner* — David Crowe

(74) *Attorney, Agent, or Firm* — Kenealy Vaidya LLP

(57) ABSTRACT

An LED lighting unit, and a vehicle lamp using the LED lighting unit can have a favorable light distribution that can be perceived as a single, integrated lighting surface. The LED lighting unit can include a plurality of base boards, a plurality of LED light sources located on each mounting surface of the base boards, a plurality of parabolic reflectors and at least one V-shaped reflector configured to locate between the adjacent parabolic reflectors. Because each of the LED light sources is located substantially at each focus of the parabolic reflectors and the at least one V-shaped reflector, light emitted from the LED light sources can be illuminated as a single, integrated light via their reflectors. Thus, a vehicle lamp using the LED lighting unit can have a favorable light distribution that can be perceived as a single, integrated lighting surface and which can be used for a headlight, a tail lamp, etc.

16 Claims, 9 Drawing Sheets

LED LIGHTING UNIT AND VEHICLE LAMP

This application claims the priority benefit under 35 U.S.C. §119 of Japanese Patent Application No. 2008-087470 filed on Mar. 28, 2008, which is hereby incorporated in its entirety by reference.

BACKGROUND

1. Field

The presently disclosed subject matter relates to an LED lighting unit including a plurality of LED light sources and a plurality of reflectors and a vehicle lamp using the LED lighting unit. The LED lighting unit can be a high-power LED lighting unit having a favorable light distribution that can be used for vehicle lamps such as a headlight and the vehicle lamps using the same that can be perceived as a single, integrated lighting surface.

2. Description of the Related Art

Various LED lighting units using a reflector have been used for vehicle lamps in recent years. One reason is that LED light sources can emit variously-colored lights while the structure thereof can be thin and small in size. A high-power LED light source can be used for a vehicle lamp in order to reduce the number of LED chips. However, when a high-power LED light source is used for a vehicle lamp, the LED lighting units may include a heat sink with the LED light source in order to radiate a heat generated from the LED light source.

A conventional headlight combining a plurality of high-power LED light sources, each including a heat sink, with a plurality of reflectors is disclosed in patent document No. 1 (Japanese Patent Application Laid Open JP2007-305575). FIG. 8 is a schematic side cross-sectional view showing a basic structure of a conventional headlight combining a plurality of high-power LED light sources with a plurality of reflectors disclosed in patent document No. 1. The headlight 20 includes a projector headlight 22 using a high-power LED light source 22$b$ and a reflector-type headlight 23 using a second LED light source 23$b$, which is located under the projector headlight 22.

The projector headlight 22 can include: a high-power white LED light source 22$b$; a heat sink 25 connected to the LED light source 22$b$; an elliptical reflector 22$d$ in which a first focus thereof is located near the LED light source 22$b$; a projector lens 22$e$ which has a focus thereof located near a second focus of the elliptical reflector 22$d$; and a shade 22$f$ having a top edge located near the focus of the projector lens 22$e$.

In the conventional projector head light 22, a part of the light emitted from the light source 22$b$ directly passes through the projector lens 22$e$ and another part of the light indirectly passes through the projector lens 22$e$ by reflecting on the elliptical reflector 22$d$. In this case, because the shade 22$f$ can shield an upward light of the lights, the projector headlight 22 can form a light distribution pattern having a cut-off line formed by the shade 22$f$.

The reflector-type headlight 23 can include: a second white LED light source 23$b$; a heat sink 26 connected to the other LED light source 23$b$; and a parabolic reflector 23$d$ in which a focus thereof is located near the other light source 23$b$. Therefore, the reflector-type headlight 23 can emit a horizontal light under the cut-off line in the same direction as that of the projector headlight 20. The amount of light emitted from the projector headlight 20 using the LED light source 22$b$ may be small in comparison with a headlight using a HID light source. Light emitted by the reflector-type headlight 23 can supplement the light emitted by the projector headlight 22 in the headlight 20.

However, when viewing the illuminated headlight 20 from the front of the vehicle, the light emitted from the projector headlight 22 and the light emitted from the reflector-type headlight 23 may be seen as separate headlights, and therefore the combined light may not be perceived as a single, integrated light distribution pattern.

In addition, because the headlight 20 includes heat sink 25 connected to the LED light source 22$b$ and heat sink 26 connected to the other LED light source 23$b$, a space between the projector headlight 22 and the reflector-typed headlight 23 may be required. Therefore, the above-described lights may be perceived as two lamps that emit respective light.

Moreover, when the respective radiating efficiencies of their heat sinks 25 and 26 are increased with respect to each other, the space between the heat sinks 25 and 26 may become larger. Each of the headlights 22 and 23 can include an adjustment mechanism that can adjust an optical axis between these headlights 22 and 23. The space that may be required for the adjustment mechanisms may also contribute to the perception of that their two lamps emit the respective light separately. Thus, the conventional structure may include a problem such that it may not be perceived as a single, integrated lighting surface.

A conventional signal light that combines a plurality of high-power LED light sources, including a heat sink, with a plurality of reflectors is disclosed in patent document No. 2 (Japanese Patent Application Laid Open JP2002-93206). FIG. 9 is a schematic side cross-sectional view showing a basic structure in a conventional signal light combining a plurality of high-power LED light sources with a plurality of reflectors disclosed in patent document No. 2.

The conventional signal light 30 includes: a circuit board 31; a plurality of high-power LED light sources 32 mounted on the circuit board 31; a insulating sheet 33 having a thermal conductivity located underneath the circuit board 31; a heat sink 34 located underneath the insulating sheet 33; and a chassis 35 including a plurality of reflectors attached to the circuit board 31 together with both the insulating sheet 33 and the heat sink 34 so as to locate the LED light sources 32 in the reflectors thereof.

The light-emission may be very bright in the conventional signal light 30 because a direct light of the light emitted from the LED light sources 32 and a reflective light via the reflectors of the chassis 35 can be illuminated in a direction towards the light-emission of the signal light 30. In addition, the radiating efficiency may become high because the heat sink 34 can be located underneath the circuit board 31 mounting the LED light sources 32 via the insulating sheet 33 having a thermal conductivity.

However, when seeing the light-emitting state of the signal light 30 from the light-emitting direction, the light emitted from the reflectors and a part of the chassis 35 without the reflectors may be seen as a respective separate lighting surface and therefore their lights may not be perceived as a single, uniform lighting surface.

Thus, a light diffusing member may be required over the signal light 30. Moreover, when the emitting area of the signal light 30 becomes large and/or curved, the signal light 30 may include problems such as an increase in the number of the LED light sources, an increase in the driving current, a plurality of the signal lights 30 may be required, and so on.

The above-referenced Patent Documents are listed below and are hereby incorporated with their English abstracts in their entirety.

1. Patent document No. 1: Japanese Patent Application Laid Open JP2007-305574
2. Patent document No. 2: Japanese Patent Application Laid Open JP2002-93206

The disclosed subject matter has been devised to consider the above and other problems, characteristics and features. Thus, an embodiment of the disclosed subject matter can include an LED lighting unit that can be perceived as a single, integrated lighting surface and can be placed in a small casing while maintaining a high radiating efficiency. The disclosed subject matter can also include a vehicle lamp using the LED lighting unit, which can maintain a favorable light distribution with a simple structure.

SUMMARY

The presently disclosed subject matter has been devised in view of the above and other characteristics, desires, and problems in the conventional arts, and to make certain changes to the existing structure of an LED lighting unit. Thus, an aspect of the disclosed subject matter includes providing a headlight using an LED lighting unit that can be perceived as a single, integrated lighting surface while maintaining a predetermined brightness and being small in size. In addition, the aspect of the disclosed subject matter can include providing an vehicle lamps including a signal light using an LED lighting unit, wherein the vehicle lamps can be used as signal lights with a favorable light distribution and an excellent outside appearance.

According to another aspect of the disclosed subject matter, an LED lighting unit can include: a base plate; a plurality of base boards, each having a mounting surface, located in a line on a side surface of the base plate, and each mounting surface thereof aligned adjacent to the side surface in a common direction; a plurality of heat sinks located on the respective surfaces opposite each mounting surface of the base boards; a plurality of LED light sources mounted on the respective mounting surfaces of the base boards, and a virtual line connecting the LED light sources configured substantially in a virtual flat surface or substantially planar surface; a plurality of parabolic reflectors each having a focus, each focus thereof located substantially at each LED light source; and at least one V-shaped reflector located between the adjacent parabolic reflectors.

In the above-described exemplary LED lighting unit, the plurality of base boards can be formed as a single, integrated base board and also the plurality of heat sinks can be formed as a single, integrated unit. In addition, the at least one V-shaped reflector can be integrated into the plurality of parabolic reflectors, and each of the LED light sources can also be located on each symmetric axis of the parabolic reflectors and each relative intensity of the LED light sources can be 50 percent or more (relative to the light intensity of each respective light source) at an angular point of 60 degrees when each intensity thereof is 100 percent at an angular point of 0 degree. In other words, if the maximum value is defined at 100 percent, the relative light intensity becomes lower at other angular points (e.g., 60 degrees) than at the maximum value (100 percent) at the "0 degree" point. Furthermore, at least one auxiliary reflector can be included that may reflect a light emitted from at least one of the LED light sources towards the at least one V-shaped reflector.

According to the above-described exemplary LED lighting unit, light emitted from the plurality of LED light sources can be reflected via both the plurality of parabolic reflectors and the V-shaped reflector located between the adjacent parabolic reflectors, and their reflective light can be emitted in a direction towards the light-emission of the LED lighting unit. Thus, the light emitted from the LED lighting unit can be perceived as a single, integrated light.

According to an aspect of the disclosed subject matter, a vehicle lamp including an LED lighting unit can further include an outer lens located adjacent the LED lighting unit and a housing located adjacent the outer lens. Thus, the vehicle lamp can conform to a light distribution standard for a vehicle lamp because the light emitted from the LED lighting unit can be perceived as a single, integrated light.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
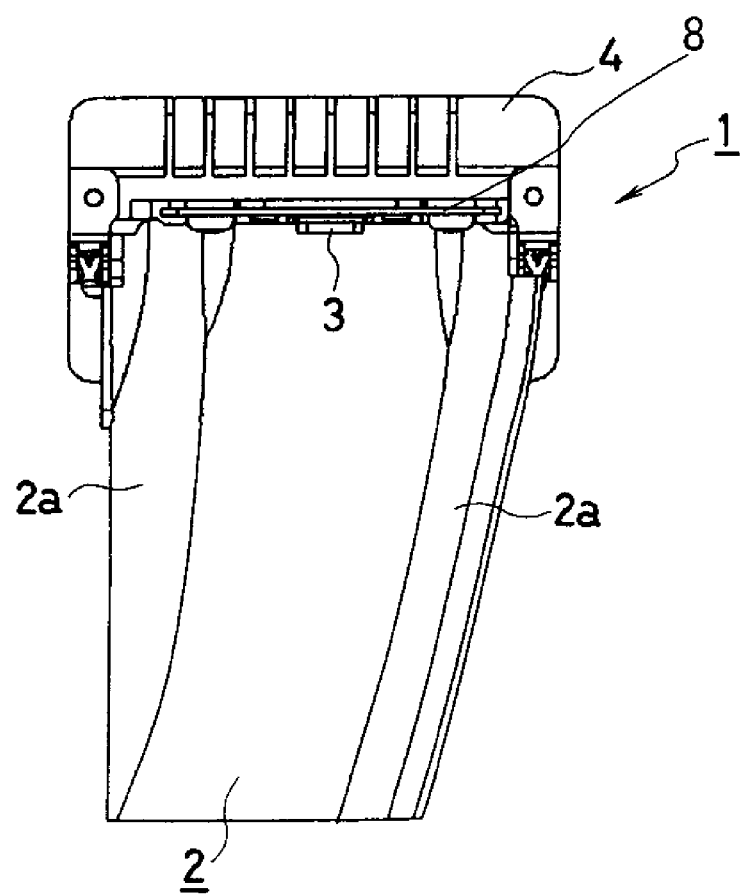
FIG. 1 is an enlarged front view showing a subassembly in an exemplary embodiment of an LED lighting unit for a vehicle lamp made in accordance with principles of the disclosed subject matter.
Figure 2:
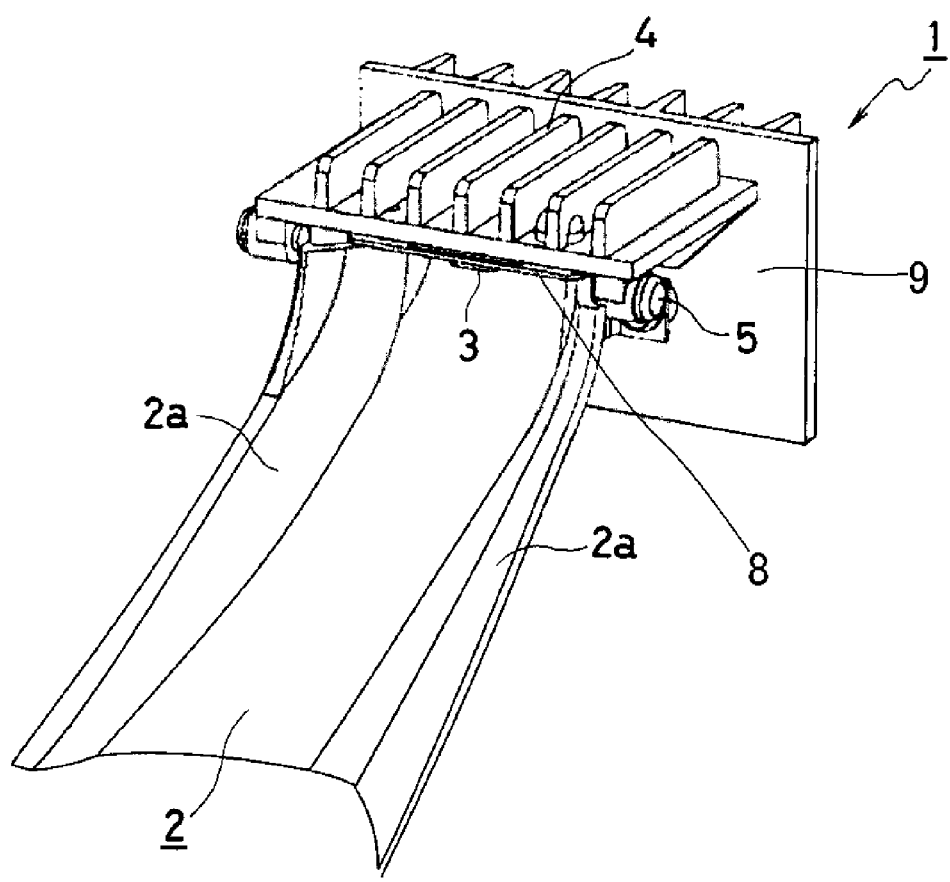
FIG. 2 is a perspective view showing the subassembly of the LED lighting unit shown in FIG. 1.

The disclosed subject matter will now be described in detail with reference to FIGS. 1 to 7. FIG. 1 is an enlarged front view showing a subassembly in an exemplary embodiment of an LED lighting unit for a vehicle lamp made in accordance with principles of the disclosed subject matter. FIG. 2 is a perspective view part of the subassembly shown in FIG. 1.

The LED lighting component 1 can include: a base board 8 having a mounting surface; an LED light source 3 mounted on the mounting surface of the base board 8; a heat sink 4 located on the opposite surface to the mounting surface of the base board 8; and a parabolic reflector 2 having a focus located substantially at the LED light source 3 mounted on the mounting surface of the base board 8.

Referring to FIG. 2, a plurality of the LED lighting components 1 can be located on a side surface of a base plate 9 so that a plurality of the mounting surfaces of the base boards 8 can be aligned adjacent to the side surface in the same direction. In this case, LEDs of various light colors can be used as the light source 3 for the LED lighting component 1.

For example, a white LED light source can be used as the light source 3 for a headlight, an auxiliary headlight such as a fog lamp, a spot light, etc. In another example, a yellow LED light source can be used as the light source 3 for a fog lamp, a directional signal lamp, etc. Similarly, a red LED light source can be employed as the light source 3 for a tail lamp, a brake lamp and the like. Different colored light sources 3 could also be used in the same LED lighting component 1.

The base board 8 can be made using a high temperature conductive material, such as a metal board that can be made from Au, Al, alloys thereof, and the like, with an insulating layer thereon for mounting the LED light source 3. In another embodiment, the base board 8 can be made using a ceramic substrate, such as $Al_2O_3$, AlN, SiC, $Si_3N_4$ and $ZrO_2$. The base board 8 can include a pair of electrodes electrically connected to the LED light source 3 on the mounting surface thereof, and the pair of electrodes can be connected to external electrodes for receiving a power supply.

However, when the LED light source 3 includes the base board 8, the LED light source 3 can be directly attached to the heat sink 4 and can receive a power supply via the external electrodes. The heat sink 4 and the base plate 9 can be made of a metallic plate and can radiate heat generated from the LED light source 3 to the outside. In the LED lighting unit of the disclosed subject matter, the plurality of heat sinks 4 can be located adjacent to the side surface of the base plate 9 and oriented in the same (i.e., common) direction. As a result, a lighting unit according to the disclosed subject matter can avoid the above-described problem in the conventional art where a large space between the respective heat sinks may be required.

The parabolic reflector 2 can be composed of a parabolic reflective surface having a focus and can include subsidiary surfaces 2a at both opposite ends to a symmetric axis intersecting with the focus. The LED light source 3 can be located substantially at the focus of the parabolic reflective surface, and therefore a light emitted from the LED light source 3 can become parallel to the symmetric axis via the parabolic reflector 2.

However, light in addition to the parallel light may be required in order to conform to a light distribution standard for a vehicle lamp. For instance, dispersing light rightward and leftward to the symmetric axis of the parabolic reflector 2 and upwardly and downwardly dispersed light may be required. In the case, the subsidiary surfaces 2a can generate this light dispersion by reflecting light emitted from the LED light source 3.

In order to conform to a light distribution standard for a vehicle lamp such as a headlight, a fog lamp, a spot light, a signal light and the like, the parabolic reflector 2 can be configured to include a plurality of subsidiary surfaces 2a. For example, the LED lighting component 1 shown in FIGS. 1 and 2 can be a subassembly in an exemplary LED lighting unit for a fog lamp, which is attached to a right side of a vehicle. Thus, the parabolic reflector 2 can be configured to reflect a majority of the light in a direction forward and rightward of the vehicle using the subsidiary surfaces 2a.

An LED lighting component in the exemplary LED lighting unit for the fog lamp that can be attached to a left side of the vehicle can be formed bilaterally symmetric, and therefore the parabolic reflector 2 can be configured to reflect a majority of the light in a direction forward and leftward of the vehicle using the subsidiary surfaces 2a. The light-emitting direction can be adjusted by an adjuster 5 shown in FIG. 2.

When a light distribution pattern for a high beam headlight is formed with the parabolic reflector 2, the parabolic reflector 2 can be configured to reflect the majority of the light in a center direction of a road ahead of the vehicle. When a light distribution pattern for a spot lamp is formed with the parabolic reflector 2, the parabolic reflector 2 can be configured so as to illuminate ahead of the road with a small and bright light distribution.

Figure 3:
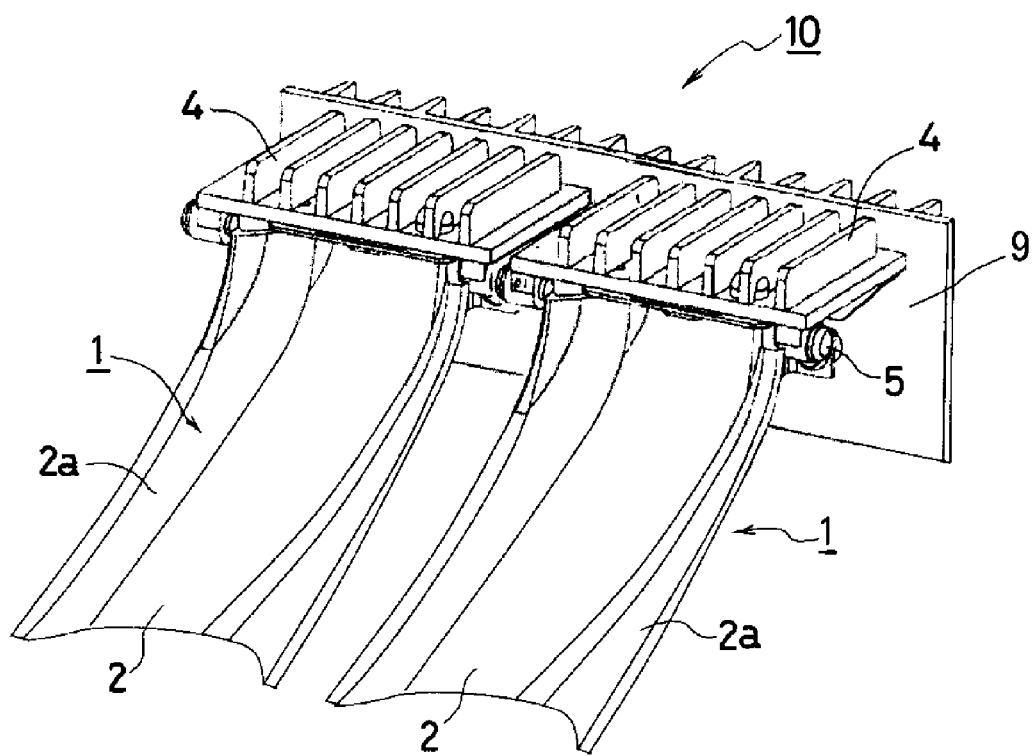
FIG. 3 is a perspective view showing a configuration of an exemplary embodiment according to the disclosed subject matter having two LED lighting components on a base plate.

FIG. 3 is a perspective view showing two LED lighting components 1 located on the side surface of the base plate 9. A fog lamp using two LED lighting components 1 can result in an increase in the amount of light emitted. However, because the two lighting components 1 may be spaced apart, the light emitted from the two lighting components 1 may be perceived as being emitted from two separate lamps in a manner similar to the conventional art, even if the space is covered.

A vehicle lamp including a distance between lighting areas therein may not conform to a light distribution standard for a vehicle lamp (e.g. ECE regulations). Therefore, the space between the two light components 1 shown in FIG. 3 should be reduced or eliminated. However, it may be difficult to do in practice, in some cases.

Figure 4:
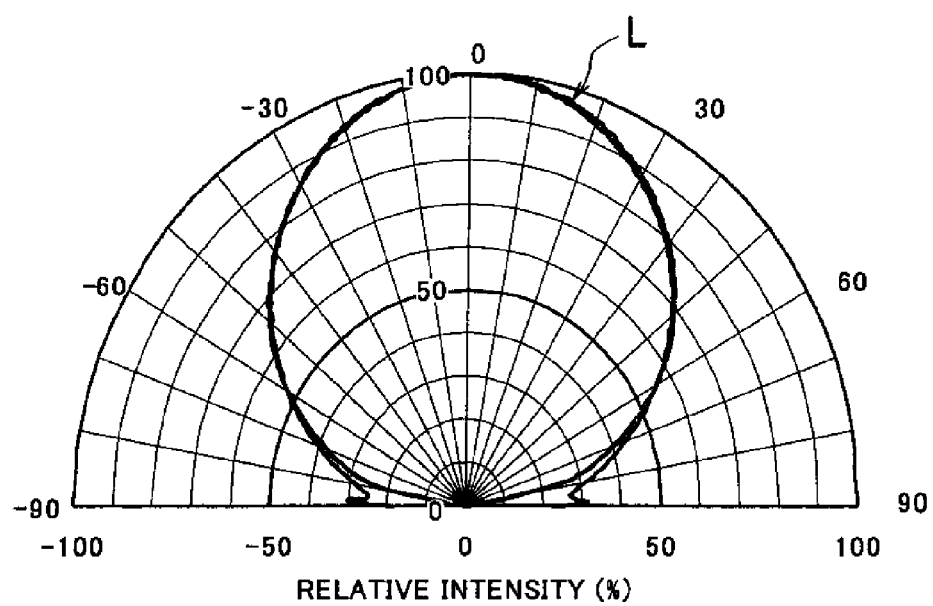
FIG. 4 is a diagram showing a lambertian radiation pattern of an LED light source used for the LED lighting component shown in FIG. 3.

FIG. 4 is a diagram showing a lambertian radiation pattern L of an LED light source used for the LED lighting component shown in FIG. 3. A relative intensity of the LED light source can be approximately 55 at an angular point of approximately 60 degrees when the intensity thereof becomes approximately 100 at approximately a right point (an angular point of approximately 0 degree).

Figure 5:
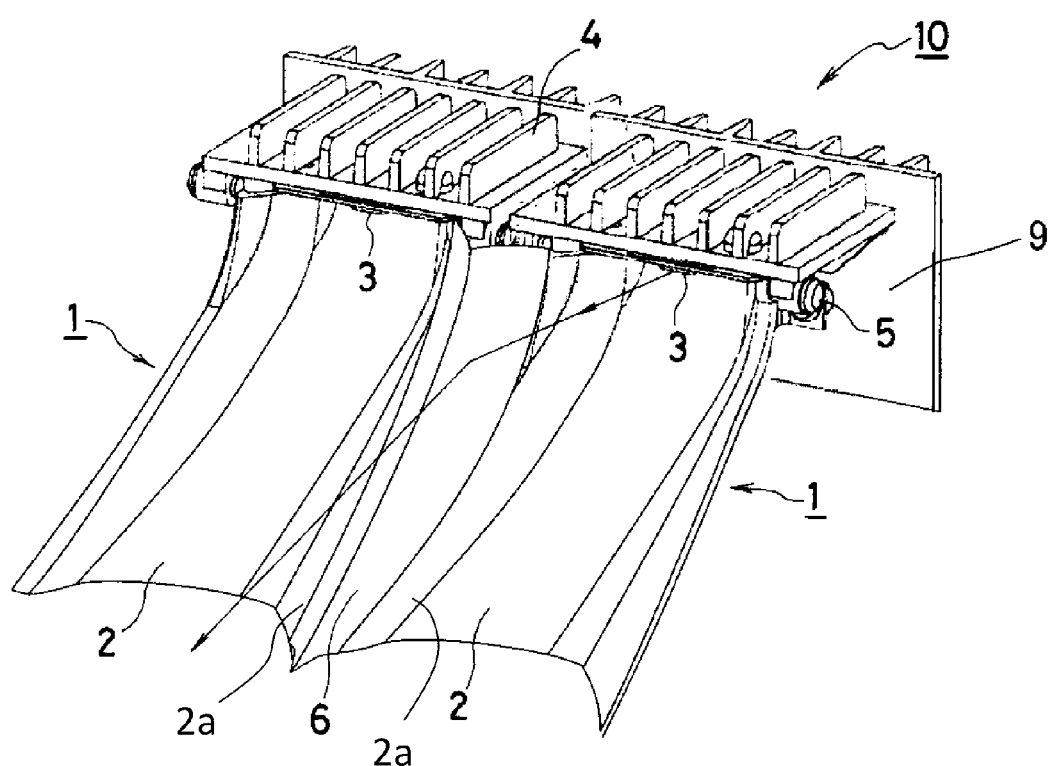
FIG. 5 is a perspective view showing an exemplary embodiment of an LED lighting unit for a vehicle lamp made in accordance with principles of the disclosed subject matter.

FIG. 5 is a schematic perspective view showing an exemplary embodiment of an LED lighting unit for a vehicle lamp made in accordance with principles of the disclosed subject matter, wherein a V-shaped reflector 6 can be located between the above-described two parabolic reflectors 2 so as to fill the space between the adjacent LED lighting components 1 that may not emit a light.

The V-shaped reflector 6 can be composed of two parabolic reflectors 2, each having a focus, and each focus can be located substantially at each LED light source 3 of the adjacent LED lighting components 1. Thus, the V-shaped reflector 6 can reflect the light emitted from each LED light source 3 of the adjacent LED lighting components 1 that is not received by each parabolic reflector 2. The light reflected with the V-shaped reflector 6 can be emitted in the same direction as the light of the LED lighting components 1. The LED light sources 3 can be located in a substantially straight linear array so as to be connected by a virtual line, and can all be located in a substantially flat co-planar relationship. The virtual line connecting the LED light sources can also be considered to be configured substantially in a virtual flat surface where the flat surface is normal to the light emitting direction of the LED light sources 3.

In addition, the V-shaped reflector 6 can be formed along each subsidiary surface 2a of the respective adjacent ends of the adjacent parabolic reflectors 2. The light emitted from the V-shaped reflector 6 and the light emitted from the parabolic reflectors 2 can be perceived as a single, integrated light. Thus, a vehicle lamp using the LED lighting unit 10 can conform to a light distribution standard for a vehicle lamp.

The LED lighting unit 10 is described using two LED lighting components 1. However, the LED lighting unit 10 is not limited to two LED lighting components 1, but three or more LED light components can also be configured if the V-shaped reflector can be located between the adjacent parabolic reflectors 2 because the light reflected by each reflector 2 can be perceived as a single, integrated light.

Figure 6:
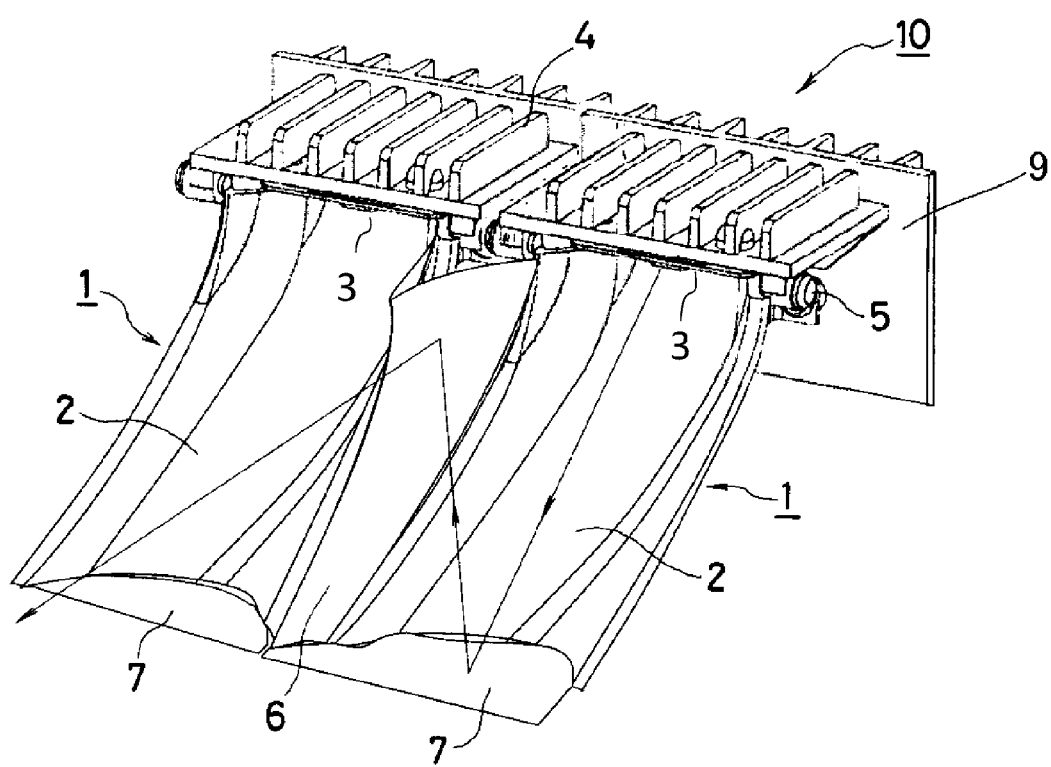
FIG. 6 is a perspective view showing another exemplary embodiment of an LED lighting unit for a vehicle lamp made in accordance with principles of the disclosed subject matter.

FIG. 6 is a schematic perspective view showing another exemplary embodiment of an LED lighting unit for a vehicle lamp made in accordance with principles of the disclosed subject matter. The LED lighting unit 10 can include at least one auxiliary reflector 7 that can be located at a position separate from both the parabolic reflectors 2 and the V-shaped reflector 6 and in which the auxiliary reflector 7 can receive light emitted from each LED light source 3.

The auxiliary reflector 7 can reflect light emitted from at least one of the LED light sources 3 toward the V-shaped reflector 6, and the reflected light can be reflected in a light-emitting direction of the LED lighting unit 10 via the V-shaped reflector 6. For instance, the auxiliary reflector 7 can be located adjacent to the parabolic reflector 2 as shown in FIG. 6 and also can be located external to the LED lighting components 1 (i.e., spaced from the lighting component 1).

In addition, a plurality of auxiliary reflectors 7 can be located separately. Thus, the LED lighting unit 10 can improve the appearance as a single, integrated light because the auxiliary reflector 7 can increase the amount of light reflected on the V-shaped reflector 6 where the amount of light might otherwise be deficient.

In the above-described exemplary embodiment, the plurality of base boards can be formed as a single, integrated base board, and at the same time the plurality of heat sinks can also be formed as a single, integrated heat sink. In this case, it may become easy to adjust the optical axes of the vehicle lamp using the LED lighting unit by the adjustors 5 because the plurality of LED light sources can be easily mounted on the mounting surface of the base board on a flat surface.

In addition, the V-shaped reflector 6 can be integrated into the adjacent parabolic reflectors 2. A vehicle lamp using the LED lighting unit may become easier to adjust the optical axis using one adjustor 5, and also can reduce the manufacturing process requirements.

The above-described LED light sources can be located substantially at each focus of the plurality of parabolic reflectors 2. However, the LED light sources are not limited to being located at each focus of the parabolic reflectors 2, and can be located at other locations, including on each symmetric axis intersecting with each focus. When the LED light source 3 is located at a position farther from the parabolic reflector 2 than the focus on the symmetric axis, the light reflected on the parabolic reflector 2 can be illuminated so as to brightly constrict.

On the other hand, when the LED light source 3 is located at a position closer to the parabolic reflector 2 than the focus on the symmetric axis, the light reflected on the parabolic reflector 2 can become diffuse. Thus, when the LED lighting unit 10 is used for a signal light such as a tail lamp and the like, the above structure can be useful because the light may illuminate on a wide area instead of a narrow bright light.

Moreover, when a virtual line connecting the LED light sources is configured as a curved line in a horizontal direction and/or a vertical direction, various shapes of vehicle lamps can be formed while reflecting light via both the parabolic reflector 6 and the V-shaped reflector 7 can prevent a non-lighting area.

Figure 7A:
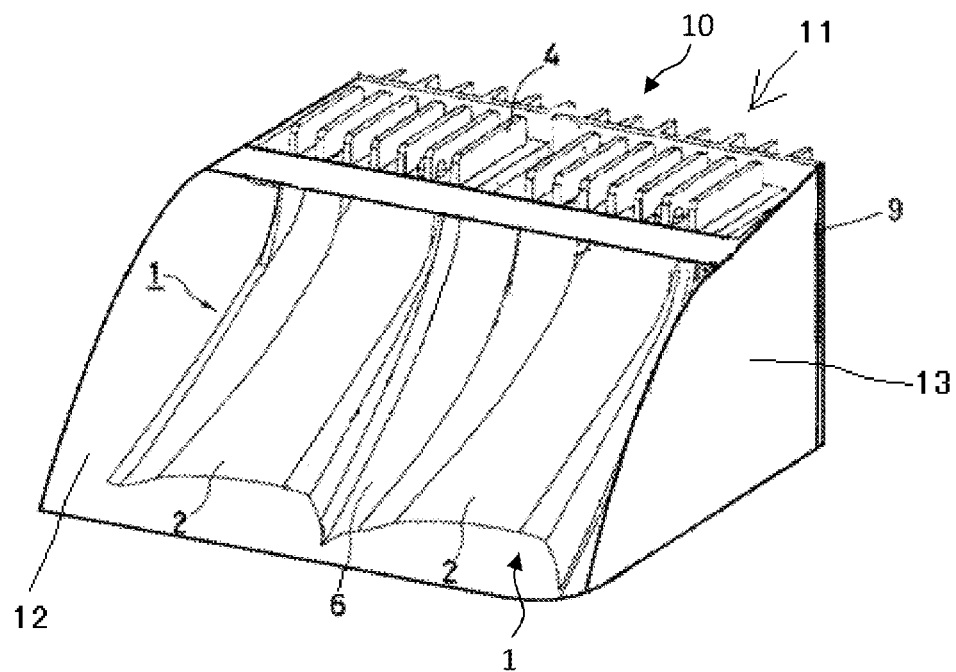
FIG. 7(A), (B) are a perspective view depicting an exemplary embodiment of a vehicle lamp using an LED lighting unit made in accordance with principles of the disclosed subject matter and a schematic partial cross-section view depicting another embodiment of a vehicle lamp, respectively.

FIG. 7(A) is a perspective view depicting an exemplary embodiment of a vehicle lamp using an LED lighting unit made in accordance with principles of the disclosed subject matter. The vehicle lamp 11 can include an outer lens 12 that is located adjacent the LED lighting unit 10 including the two lighting components 1 and a housing 13 located adjacent the outer lens 12. The outer lens 12 can be made from a transparent material such as an acrylic resin, etc.

The housing 13 can be made from a metal, a resin and the like, and the above-described base plate 9 can be integrated into the housing 13 made from a metal plate. The housing 13, along with the outer lens 12, can protect the LED lighting unit 10 from dirt and dust and the like. The vehicle lamp 11 using the LED lighting unit 10 can be used for a headlight or an auxiliary headlight such as a fog lamp, a spot lamp, etc.

In the exemplary embodiment of the vehicle lamp 11, because the plurality of heat sinks 4 can be located on a top surface of the vehicle lamp 11 that is exposed to the outside in a line, their radiating efficiencies may become high and the space therebetween need not be considered. Moreover, the aesthetic appearance of the lighted reflectors in a small housing can be seen via the transparent outer lens 12, and therefore the disclosed subject matter can provide a vehicle lamp having a good outside appearance and a favorable light distribution that can be perceived as a single, integrated lighting surface.

Figure 7B:
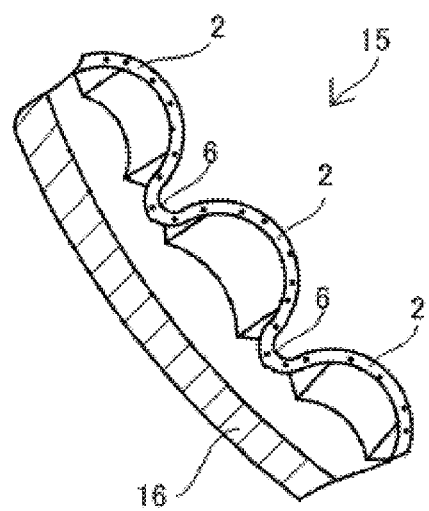
Figure 8:
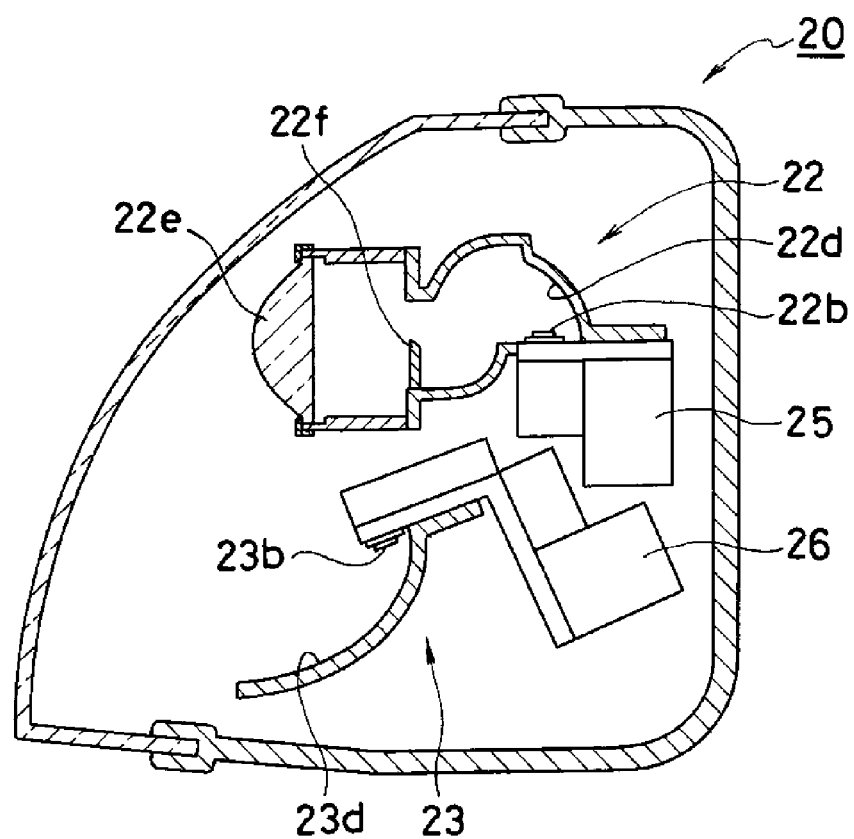
FIG. 8 is a side cross-sectional view showing a basic structure in a conventional headlight combining a plurality of high-power LED light sources with a plurality of reflectors.
Figure 9:
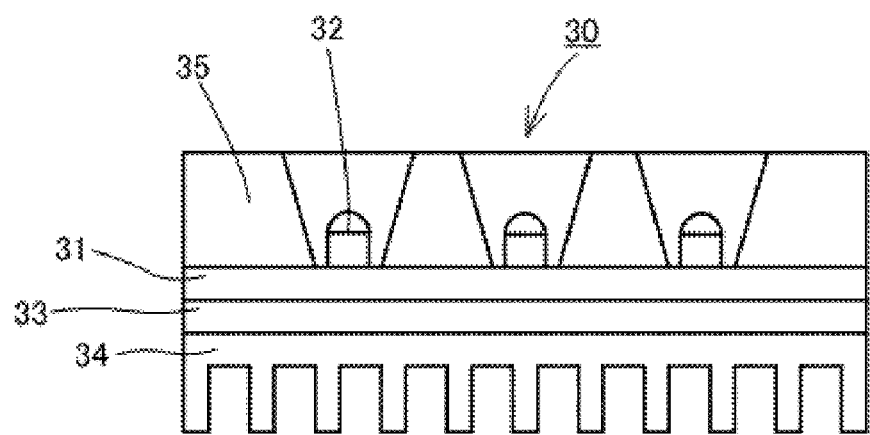
FIG. 9 is a side cross-section view showing a basic structure in a conventional signal light combining a plurality of high-power LED light sources with a plurality of reflectors.

FIG. 7(B) is a partial cross-section view depicting another embodiment of a vehicle lamp using an LED lighting unit made in accordance with principles of the disclosed subject matter. The vehicle lamp 15 can include an outer lens 16 that is located adjacent the LED lighting unit 10 including the plurality of LED lighting components 1. The vehicle lamp 15 can be used for a signal light such as a tail lamp, a brake lamp, a turn signal lamp, etc.

In the other exemplary embodiment of the vehicle lamp 15, the vehicle lamp 15 can emit light reflected on reflectors 2 and 6 via the outer lens 16 with a large area formed in various shapes without creating non-lighting portions of the reflective surfaces. In addition, the vehicle lamp 15 can include both a tail lamp and a brake lamp by changing their light intensities and also can include a turn signal lamp by changing the lighting colors of the LED light sources 3. Thus, the disclosed subject matter can provide a vehicle lamp having an exquisite outside appearance that can be perceived as a single, integrated lighting surface.

Various modifications of the above disclosed embodiments can be made without departing from the spirit and scope of the presently disclosed subject matter. For example, a headlamp can be structured by combining a plurality of LED light sources mounted on one base board with an integrated reflector and the respective different reflectors using the above-described structure, which have respective different light distribution patterns such as a headlight, a fog lamp, a spot lamp, etc.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. An LED lighting unit, comprising:
   a base plate having a side surface;
   a plurality of base boards aligned on the side surface of the base plate, each of the plurality of base boards including a mounting surface and an opposite surface opposite to the mounting surface, and each of the mounting surfaces aligned adjacent to the side surface in a same direction;
   a plurality of heat sinks located adjacent respective ones of the opposite surfaces of the plurality of base boards;
   a plurality of LED light sources mounted on respective mounting surfaces of the plurality of base boards in a substantially co-planar relationship, and a virtual line connecting the LED light sources being substantially normal to a light emitting direction of the plurality of LED light sources;

a plurality of parabolic reflectors, each of the plurality of parabolic reflectors being adjacent to and having a space between another one of the plurality of parabolic reflectors, and each of the plurality of parabolic reflectors including a parabolic reflective surface having a focus, each focus located substantially at a respective one of the plurality of LED light sources; and at least one V-shaped reflector including two parabolic reflectors, located between adjacent ones of the plurality of parabolic reflectors, and the at least one V-shaped reflector filling the space between the adjacent ones of the parabolic reflectors, wherein a boundary between the two parabolic reflectors of the at least one V-shaped reflector extends in a linear fashion between the adjacent ones of the plurality of parabolic reflectors, the at least one V-shaped reflector reflects light emitted from the respective ones of the plurality of LED light sources that is not received by each of the plurality of parabolic reflectors, and thereby the plurality parabolic reflectors and the at least one V-shaped reflector are configured to transform light emitted from the plurality of LED light sources into a single, integrated light.

2. The LED lighting unit according to claim 1, wherein each of the plurality of LED fight sources has a relative intensity of at least 50 percent at an angular point of substantially 60 degrees when an intensity of each of the plurality of LED light sources is substantially 100 percent at an angular point of substantially 0 degree.

3. The LED lighting unit according to claim 2, further comprising:
at least one auxiliary reflector configured to reflect light emitted from at least one of the plurality of LED light sources towards the at least one V-shaped reflector.

4. The LED lighting unit according to claim 1, further comprising:
at least one auxiliary reflector configured to reflect light emitted from at least one of the plurality of LED light sources towards the at least one V-shaped reflector.

5. A vehicle lamp including the LED lighting unit according to claim 1, further comprising:
an outer lens located adjacent the LED lighting unit; and
a housing located adjacent the outer lens.

6. The vehicle lamp according to claim 5, wherein the plurality of LED light sources emit white light and each of the plurality of LED light sources has a relative intensity of at least 50 percent at an angular point of substantially 60 degrees when an intensity of each of the plurality of LED light sources is substantially 100 percent at an angular point of substantially 0 degree.

7. The vehicle lamp according to claim 6, further comprising:
at least one auxiliary reflector configured to reflect light emitted from at least one of the LED light sources towards the at least one V-shaped reflector.

8. The vehicle lamp according to claim 5, further comprising:
at least one auxiliary reflector configured to reflect light emitted from at least one of the plurality of LED light sources towards the at least one V-shaped reflector.

9. An LED lighting unit, comprising:
a base plate having a side surface;
a plurality of base boards located on the side surface of the base plate, each of the plurality of base boards including a mounting surface and an opposite surface opposite to the mounting surface, and each of the mounting surfaces located adjacent to the side surface and oriented in a same direction;

a plurality of heat sinks located adjacent respective ones of the opposite surfaces of the plurality of base boards;

a plurality of LED light sources mounted adjacent respective ones of the mounting surfaces of the base boards;

a plurality of parabolic reflectors, each of the plurality of parabolic reflectors being adjacent to and having a space between another one of the plurality of parabolic reflectors, and each of the plurality of parabolic reflectors including a parabolic reflective surface having a symmetric axis, and each symmetric axis intersecting with a respective one of the plurality of LED light sources; and at least one V-shaped reflector including two parabolic reflectors, located between adjacent ones of the plurality of parabolic reflectors, and the at least one V-shaped reflector filling the space between the adjacent ones of the parabolic reflectors, wherein a boundary between the two parabolic reflectors of the at least one V-shaped reflector extends in a linear fashion between the adjacent ones of the plurality of parabolic reflectors, the at least one V-shaped reflector reflects light emitted from the respective one of the plurality of LED light sources that is not received by each of the plurality of parabolic reflectors, and thereby the plurality of parabolic reflectors and the at least one V-shared reflector are configured to transform light emitted from the plurality of LED light sources into a single, integrated light.

10. The LED lighting unit according to claim 9, wherein each of the plurality of LED light sources has a relative intensity of at least 50 percent at an angular point of substantially 60 degrees when an intensity of each of the plurality of LED light sources is substantially 100 percent at an angular point of substantially 0 degree.

11. The LED lighting unit according to claim 10, further comprising:
at least one auxiliary reflector configured to reflect light emitted from at least one of the plurality of LED light sources towards the at least one V-shaped reflector.

12. The LED lighting unit according to claim 9, further comprising:
at least one auxiliary reflector configured to reflect light emitted from at least one of the plurality of LED light sources towards the at least one V-shaped reflector.

13. A vehicle lamp including the LED lighting unit according to claim 9, further comprising:
an outer lens located adjacent the LED lighting unit.

14. The vehicle lamp according to claim 13, wherein the plurality of LED light sources emit red light and each of the plurality of LED light sources has a relative intensity of at least 50 percent at an angular point of substantially 60 degrees when each intensity of each of the plurality of LED light sources is substantially 100 percent at an angular point of substantially 0 degree.

15. The vehicle lamp according to claim 14, further comprising:
at least one auxiliary reflector configured to reflect light emitted from at least one of the LED light sources towards the at least one V-shaped reflector.

16. The vehicle lamp according to claim 13, further comprising:
at least one auxiliary reflector configured to reflect light emitted from at least one of the LED light sources towards the at least one V-shaped reflector.

* * * * *